(12) United States Patent
Hatanaka

(10) Patent No.: US 7,948,776 B2
(45) Date of Patent: May 24, 2011

(54) ZERO VOLTAGE SWITCHING HIGH-FREQUENCY INVERTER

(75) Inventor: Yoshihiro Hatanaka, Kawasaki (JP)

(73) Assignee: National University Corporation Tokyo University of Marine Science and Technology, Tokyo-To (JP)

( * ) Notice: Subject to any disclaimer, the term of this patent is extended or adjusted under 35 U.S.C. 154(b) by 0 days.

(21) Appl. No.: 12/823,170

(22) Filed: Jun. 25, 2010

(65) Prior Publication Data

US 2010/0259959 A1    Oct. 14, 2010

Related U.S. Application Data

(62) Division of application No. 11/573,827, filed as application No. PCT/JP2005/002249 on Feb. 15, 2005, now Pat. No. 7,826,235.

(30) Foreign Application Priority Data

Aug. 16, 2004 (JP) .................. 2004-236446

(51) Int. Cl.
*H02M 3/335* (2006.01)
*H02M 7/5387* (2006.01)
(52) U.S. Cl. .......................... 363/17; 363/132
(58) Field of Classification Search .............. 363/16–17, 363/132; 315/243–244
See application file for complete search history.

(56) References Cited

U.S. PATENT DOCUMENTS

| | | | |
|---|---|---|---|
| 5,426,350 A * | 6/1995 | Lai | 315/244 |
| 6,172,550 B1 * | 1/2001 | Gold et al. | 327/366 |
| 6,411,044 B2 * | 6/2002 | Wessels et al. | 315/244 |
| 2004/0228153 A1 * | 11/2004 | Cao et al. | 363/71 |

FOREIGN PATENT DOCUMENTS

| | | |
|---|---|---|
| JP | 6-311757 | 11/1994 |
| JP | 9-28085 | 1/1997 |
| JP | 9-70174 | 3/1997 |
| JP | 2001-68288 | 3/2001 |

OTHER PUBLICATIONS

U.S. Appl. No. 12/823,167, filed Jun. 25, 2010, Hatanaka.

* cited by examiner

*Primary Examiner* — Adolf Berhane
*Assistant Examiner* — Jue Zhang
(74) *Attorney, Agent, or Firm* — Oblon, Spivak, McClelland, Maier & Neustadt, L.L.P.

(57) ABSTRACT

There is provided a zero-voltage switching high-frequency inverter capable of supplying a current of a large amplitude operation to a load, while suppressing a main switch current. The zero-voltage switching high-frequency inverter according to the present invention comprises: a first switch S1 and a second switch S2 that are connected in series between power sources Ed; a first capacitor C1, an impedance element R, and an inductor element L that are connected in series between a connecting path connecting the first switch S1 and the second switch S2 and one end of the power sources Ed; and a second capacitor C2 connected in parallel to the impedance element R and the inductor element L that are connected in series.

3 Claims, 4 Drawing Sheets

ZERO VOLTAGE SWITCHING HIGH-FREQUENCY INVERTER

This application is a division of U.S. application Ser. No. 11/573,827, filed on Feb. 16, 2007, the entire contents of which is incorporated by reference. U.S. application Ser. No. 11/573,827 is a national phase application of PCT/JP05/002249 under 35 U.S.C §371, filed on Feb. 15, 2005, which claims the benefit of priority of Japanese Patent Application No. 2004-236446, filed on Aug. 16, 2004.

BACKGROUND OF THE INVENTION

1. Field of the Invention

The present invention relates to a zero-voltage switching (ZVS) high-frequency inverter.

More particularly, the present invention relates to a zero-voltage switching (ZVS) high-frequency inverter having a simpler structure than that of a conventional one. When a load resistance value is low, the ZVS high-frequency inverter of the present invention allows a larger electric current to flow through a load, as compared with an electric current flowing through a switch.

2. Background Art

In a high-frequency inverter, there generates a switching loss, a large surge voltage, and a large surge current, with an increase in frequency.

The switching loss is caused by a phase deviation between a voltage and a current upon a switching operation. When a switch is turned on, a current flows with a voltage being applied. As a result of the current flows with the voltage being applied, the product of the current and the voltage becomes a power loss.

The surge voltage and the surge current are generated, when a switch is abruptly turned off while a current steadily flows. That is to say, when $\Delta A/\Delta T$ or $\Delta V/\Delta T$ is large, a large surge voltage and surge current are likely to occur.

These switching loss, surge voltage, and surge current result in the loss of energy, and sometimes damage a switch. Thus, various soft switching circuits have been developed and researched, in order to suppress the switching loss, surge voltage, and surge current.

These soft switching circuits are roughly classified into zero-voltage switching (ZVS) circuits and zero-current switching (ZCS) circuits.

In the zero-voltage switching circuits, a current flows after a voltage becomes zero upon turning on/off a switch. Since the voltage is zero, there is no power loss upon a switching operation.

On the other hand, in the zero-current switching circuits, a voltage is applied after a current becomes zero upon turning on/off a switch. Also in this type, there is no power loss upon a switching operation.

Referring to FIGS. 6 and 7, a conventional zero-voltage switching high-frequency inverter is described below.

FIG. 6 shows a structure of a conventional series resonance half-bridge ZVS high-frequency inverter with two switches.

In the conventional series resonance half-bridge ZVS high-frequency inverter 10 with two switches, a first switch S1 and a second switch S2 are connected in series between power sources Ed. A first capacitor C1 is connected in parallel to the first switch S1, and a second capacitor C2 is connected in parallel to the second switch S2. A third capacitor C3, an impedance element R, and an inductor element L are connected in series between a connecting path connecting the first switch S1 and the second switch S2 and one end of the power sources Ed.

By connecting the first capacitor C1 and the second capacitor C2 in parallel to the first switch S1 and the second switch S2, respectively, the generation of excessive surge voltage/current can be prevented at the first switch S1 and the second switch S2, whereby a zero-voltage function can be fulfilled.

The third capacitor C3 constitutes a series resonant circuit together with the impedance element R and the inductor element L so as to fulfill an inverter function.

FIG. 7 shows a structure of a conventional series resonance full-bridge ZVS high-frequency inverter with four switches.

In the conventional series resonance full-bridge ZVS high-frequency inverter 11 with four switches, a first switch S1 and a second switch 2 are connected in series between power sources Ed, and a third switch S3 and a fourth switch S4 are connected in series between the power sources Ed. A first capacitor C1, a second capacitor C2, a third capacitor C3, and a fourth capacitor C4 are connected in parallel to the first switch S1, the second switch S2, the third switch S3, and the fourth switch S4, respectively. A fifth capacitor C5, an impedance element R, and an inductor element L are connected in series between a connecting path connecting the first switch S1 and the second switch S2 and a connecting path connecting the third switch S3 and the fourth switch S4.

In the series resonance full-bridge ZVS high-frequency inverter 11 with four switches, the first and fourth switches S1 and S4 and the second and third switches S2 and S3 are respectively synchronized, and the switches are alternately turned on and off to generate an alternating current at the impedance element R and the inductor element L.

The first to fourth capacitors C1 to C4 prevent the generation of surge voltage/current and fulfill a zero-voltage switching function at the first to fourth switches S1 to S4. The fifth capacitor C5 constitutes a series resonant circuit together with the impedance element R and the inductor element L so as to fulfill an inverter function.

However, in the conventional series resonance half-bridge ZVS high-frequency inverter with two switches or the series resonance full-bridge ZVS high-frequency inverter with four switches, an amplitude of a current flowing through the switches and an amplitude of a current flowing through the load are equal to each other.

Thus, when a resistance of the load is small such as an induction heating load, the amplitude of a current flowing through the load becomes large, and a current of the same amplitude flows through the switches.

Under this state, although a switching loss can be reduced due to the ZVS, a conduction loss is disadvantageously increased by the current of large amplitude that flows through the switches, when the switches are on.

When the ZVS can make it possible that a current flowing through a load is large while a current flowing through switches (main switch current) is small, a significantly advantageous state can be attained in which both the switching loss and the conduction loss can be suppressed while allowing a large current to flow through the load.

Therefore, an object of the present invention is to provide a zero-voltage switching high-frequency inverter in which a larger current flows through a load while a smaller current flows through switches.

Further, in both the conventional series resonance half-bridge ZVS high-frequency inverter with two switches and the conventional series resonance full-bridge ZVS high-frequency inverter with four switches, each of the switches is provided with a capacitor, which entails a complicated circuit structure.

Needless to say, it is preferable that a structure of a circuit is simple.

Therefore, another object of the present invention is to provide a zero-voltage switching high-frequency inverter which is simple in structure.

DISCLOSURE OF THE INVENTION

A zero-voltage switching high-frequency inverter according to the present invention comprises: a first switch and a second switch that are connected in series between power sources; a first capacitor, an impedance element R, and an inductor element L that are connected in series between a connecting path connecting the first switch and the second switch and one end of the power sources; and a second capacitor connected in parallel to the impedance element R and the inductor element L that are connected in series.

The ratio between an electrostatic capacity of the first capacitor and an electrostatic capacity of the second capacitor may be set at a predetermined ratio, such that a current flowing through the impedance element is larger than a current flowing through the first switch and the second switch.

When a ratio of an amplitude of a current flowing through the impedance element (lomax) relative to an amplitude of a current flowing through the first switch and the second switch (lsmax) is Ar(lomax/lsmax), an electrostatic capacity of the first capacitor is $C_{C1}$, and an electrostatic capacity of the second capacitor is $C_{C2}$, the electrostatic capacity $C_{C1}$ of the first capacitor and the electrostatic capacity $C_{C2}$ of the second capacitor may be set such that the expression $Ar=1+C_{C2}/C_{C1}$ is satisfied.

The switches may be formed of self-turn off devices including IGBTs, MOSFETs, and SITs.

A zero-voltage switching high-frequency inverter according to the present invention comprises: a first switch and a second switch that are connected in series between power sources; a first capacitor and a second capacitor that are connected in series between the power sources; an impedance element and an inductor element that are connected in series between a connecting path connecting the first switch and the second switch and a connecting path connecting the first capacitor and the second capacitor; and a third capacitor connected in parallel to the impedance element and the inductor element.

The ratio between a total electrostatic capacity of the first capacitor and the second capacitor and an electrostatic capacity of the third capacitor may be set at a predetermined ratio, such that a current flowing through the impedance element is larger than a current flowing through the first switch and the second switch.

When a ratio of an amplitude of a current flowing through the impedance element (lomax) relative to an amplitude of a current flowing through the first switch and the second switch (lsmax) is Ar (lomax/lsmax), an electrostatic capacity of the first capacitor is $C_{C1}$, an electrostatic capacity of the second capacitor is $C_{C2}$, and an electrostatic capacity of the third capacitor is $C_{C3}$, the electrostatic capacity $C_{C1}$ of the first capacitor, the electrostatic capacity $C_{C2}$ of the second capacitor, and the electrostatic capacity $C_{C3}$ of the third capacitor may be set such that the expression $Ar=1+C_{C3}/(C_{C1}+C_{C2})$ is satisfied.

The switches may be formed of self-turn off devices including IGBTs, MOSFETs, and SITs.

A zero-voltage switching high-frequency inverter according to the present invention comprises: a first switch and a second switch that are connected in series between power sources; a third switch and a fourth switch that are connected in series between the power sources; a first capacitor, an impedance element, and an inductor element that are connected in series between a connecting path connecting the first switch and the second switch and a connecting path connecting the third switch and the fourth switch; and a second capacitor connected in parallel to the impedance element and the inductor element that are connected in series.

The ratio between an electrostatic capacity of the first capacitor and an electrostatic capacity of the second capacitor may be set at a predetermined ratio, such that a current flowing through the impedance element is larger than a current flowing through the first switch and the fourth switch or a current flowing through the second switch and the third switch.

When a ratio of an amplitude of a current flowing through the impedance element (lomax) relative to an amplitude of a current flowing through the first switch and the fourth switch or a current flowing through the second switch and the third switch (lsmax) is Ar (lomax/lsmax), an electrostatic capacity of the first capacitor is $C_{C1}$, and an electrostatic capacity of the second capacitor is $C_{C2}$, the electrostatic capacity $C_{C1}$ of the first capacitor and the electrostatic capacity $C_{C2}$ of the second capacitor may be set such that the expression $Ar=1+C_{C2}/C_{C1}$ is satisfied.

The switches may be formed of self-turn off devices including IGBTs, MOSFETs, and SITs.

The high-frequency inverter according to the present invention requires only two capacitors, although three capacitors in total have been conventionally needed for the series resonance half-bridge ZVS high-frequency inverter with two switches. The high-frequency inverter according to the present invention requires only two capacitors, although five capacitors in total have been conventionally needed for the series resonance full-bridge ZVS high-frequency inverter with four switches. The zero-voltage switching (ZVS) can be realized with the less number of capacitors.

In summary, the present invention can carry out the zero-voltage switching (ZVS) by the decreased number of capacitors, i.e., two capacitors connected in series for load and one capacitor connected in parallel to a switch for complex resonance. On the other hand, the conventional series resonance ZVS high-frequency inverter has carried out the ZVS with the capacitors which are connected in parallel to all the switches.

In other words, since the present invention is capable of decreasing the number of capacitors as constituent elements of a circuit, while ensuring the zero-voltage switching, the present invention enables a reduction in costs and a simple circuit structure.

In addition, according to the present invention, when a load is an induction heating load having a low load resistance value, for example, it is possible to allow a current to flow through the load, with an amplitude of the flow being 1.2 to 2.2 times an amplitude of a current flowing through a main switch.

As a result, a highly efficient high-frequency inverter can be provided which can suppress a conduction loss of the switches by means of the large amplitude operation of the load current, with the main switch current being suppressed.

PREFERRED EMBODIMENT OF THE INVENTION

Figure 1:
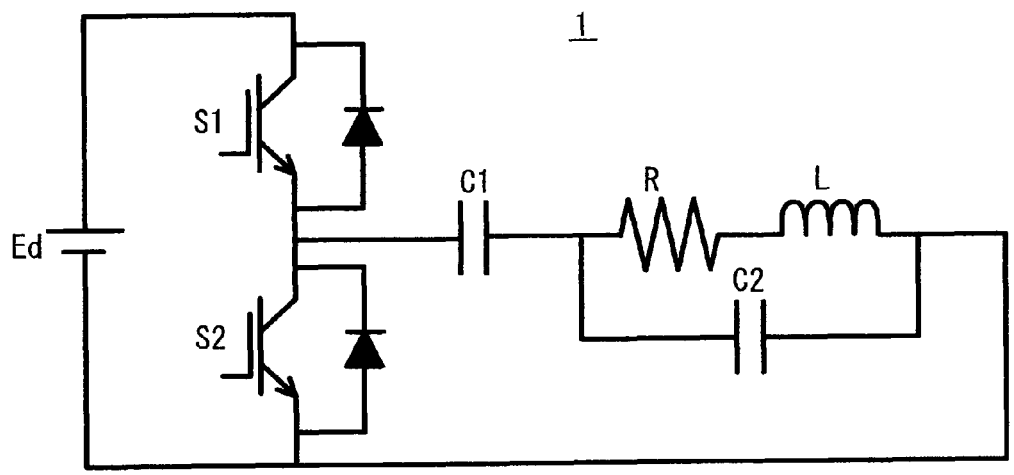
FIG. 1 is a view showing a circuit structure of a half-bridge ZVS high-frequency inverter with two switches in one embodiment of the present invention.

FIG. 1 shows a "half-bridge zero-voltage switching high-frequency inverter with two switches (half-bridge ZVS high-frequency inverter with two switches)" in one embodiment of the present invention.

As shown in FIG. 1, the half-bridge ZVS high-frequency inverter 1 with two switches in this embodiment includes: a first switch S1 and a second switch S2 which are connected in series between power sources Ed; a first capacitor C1, an impedance element R, and an inductor element L which are connected in series between a connecting path connecting the first switch S1 and the second switch S2 and one end of the power sources Ed; and a second capacitor C2 connected in parallel to the impedance element R and the inductor element L.

The "one end of the power sources Ed" may either be a positive electrode side or a negative electrode side.

The first switch S1 and the second switch S2 are formed of a transistor and a diode, respectively. Not limited to IGBTs, the first switch S1 and the second switch S2 may be any type selected from self-turn off devices such as MOSFETs and SITs.

The impedance element R and the inductor element L demonstrate an equivalent circuit of an induction heating load. In an actual circuit, an actual induction heating load is connected through a working coil.

The load is not limited to the induction heating load. However, since a conductor itself can serve as an inductor element, the load can be generally replaced with the equivalent impedance element R and the inductor element L.

The half-bridge ZVS high-frequency inverter 1 with two switches in this embodiment fulfills both the ZVS function and the high-frequency inverter function, by connecting in series the first capacitor C1, the impedance element R, and the inductor element L, and connecting the second capacitor C2 in parallel to the impedance element R and the inductor element L.

The second capacitor C2 constitutes a parallel resonant circuit together with the impedance element R and the inductor element L. By connecting the first capacitor C1 in series to the parallel resonant circuit, a sudden change in a voltage at the first switch S1 and the second switch S2 can be prevented to thereby achieve the ZVS based on charging and discharging operations upon switching.

In the present invention, as described above, the first capacitor C1 and the second capacitor C2 cooperate with each other to prevent the generation of surge voltage and surge current so that the ZVS function can be realized.

Further, according to the present invention, by suitably setting the ratio between an electrostatic capacity of the first capacitor C1 and that of the second capacitor C2, an amplitude of a current flowing through the first switch S1 and the second switch S2 (collectively referred to as "main switch current") can be made smaller than an amplitude of a current flowing through the impedance element R ("load current").

To be specific, when the amplitude of a current flowing through the first switch S1 and the second switch S2 is lsmax, and the amplitude of a current flowing through the impedance element R is lomax, a ratio Ar of the amplitude lomax of a current flowing through the impedance element R relative to the amplitude lsmax of a current flowing through the first switch S1 and the second switch S2 is represented by the following expression: Ar=lomax/lsmax.

When an electrostatic capacity of the first capacitor C1 is $C_{C1}$, and an electrostatic capacity of the second capacitor C2 is $C_{C2}$, the expression Ar=1+$C_{C2}$/$C_{C1}$ is satisfied. Thus, by setting the electrostatic capacity $C_{C1}$ of the first capacitor C1 and the electrostatic capacity $C_{C2}$ of the second capacitor C2 in accordance with a given Ar, it is possible to realize a large amplitude operation of the load current while suppressing the switch current.

The number of combinations of circuit constants is indefinite. However, in this embodiment, an input voltage Ed is 200 (V), an operating frequency fo is 40 (kHz), R is 1 (ohm), L is 42 (microhenry), C1 is 0.2 (microfarad), and C2 is 0.2 (microfarad). A dead time of a gate signal is 2 (microsecond).

Figure 2:
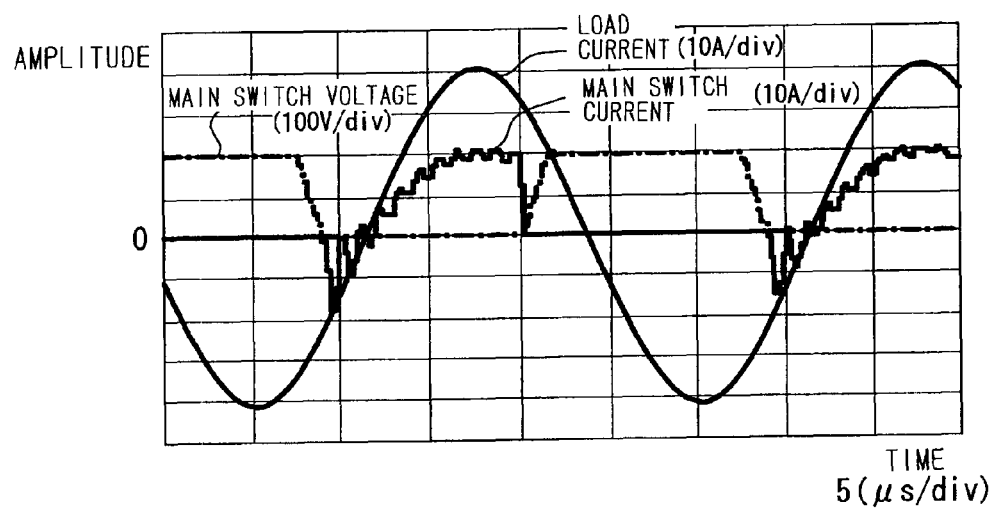
FIG. 2 is a graph showing operating waveforms in the half-bridge ZVS high-frequency inverter with two switches.

FIG. 2 shows operating waveforms in the half-bridge ZVS high-frequency inverter 1 with two switches which is operated with the above-described circuit constants.

In FIG. 2, the axis of abscissa shows the time period, the axis of ordinate shows the amplitude, the waveform of a trapezoidal shape shows the voltage of the switches S1 and S2 (main switch voltage), the half-periodic oscillation waveform shows the main switch current, and the sine waveform shows the current flowing through the load (load current).

As shown in FIG. 2, in this embodiment, the amplitude of the load current is about twice the amplitude of the main switch current. As a result of trials for the circuit constants in this embodiment and other circuit constants, the ZVS high-frequency inverter according to the present invention is capable of realizing a large amplitude operation of the loading current, while suppressing the main switch current.

As shown in FIG. 2, the main switch voltage becomes zero at the zero-cross of the main switch current (when the main switch current becomes zero). That is, as apparent from the embodiment, the ZVS function can be achieved by the ZVS high-frequency inverter according to the present invention.

The ratio between the electrostatic capacity of the first capacitor C1 and the electrostatic capacity of the second capacitor C2 mainly depends on an operating frequency of a resonant circuit and an inductance of the inductor element L.

Especially when a value of the load resistance is low (not more than 1 ohm), it can be specifically expected that the amplitude of the loading current is enlarged while the main switch current is suppressed.

By suitably setting the ratio between the electrostatic capacity of the first capacitor C1 and the electrostatic capacity of the second capacitor C2, it is possible to increase the amplitude of the load current by a factor of from 1.2 to 2.2 times the amplitude of the main switch current.

Next, a ZVS high-frequency inverter with divided capacitors according to the present invention is described below.

Figure 3:
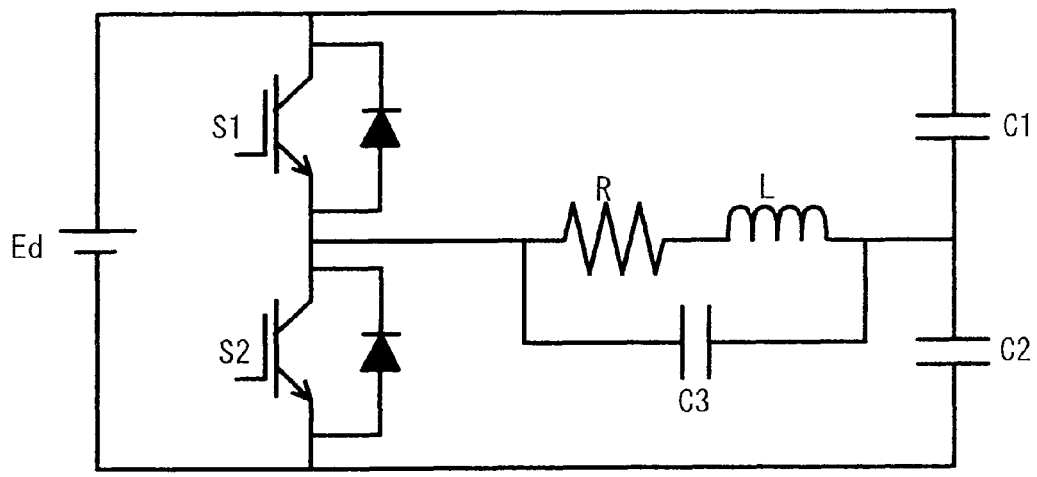
FIG. 3 is a view showing a circuit structure of a ZVS high-frequency inverter with divided capacitors in one embodiment of the present invention.

FIG. 3 shows a circuit structure of the ZVS high-frequency inverter 2 with divided capacitors in one embodiment of the present invention.

In the ZVS high-frequency inverter 2 with divided capacitors in this embodiment, a first switch S1 and a second switch S2 are connected in series between power sources Ed, and a first capacitor C1 and a second capacitor C2 are connected in series between the power sources Ed. An impedance element R and an inductor element L are connected in series between a connecting path connecting the first switch S1 and the second switch S2 and a connecting path connecting the capacitor C1 and the capacitor C2. A third capacitor C3 is connected in parallel to the impedance element R and the inductance element L.

The two capacitors (the first capacitor C1 and the second capacitor C2) in the ZVS high-frequency inverter 2 with divided capacitors in this embodiment are obtained by dividing the first capacitor C1 in the high-frequency inverter shown in FIG. 1.

The number of capacitors included in the ZVS high-frequency inverter 2 with divided capacitors in this embodiment is the same as the number of capacitors included in the conventional series resonance half-bridge ZVS high-frequency inverter with two switches. However, similar to the above-described half-bridge ZVS high-frequency inverter 1 with two switches, by suitably setting the ratio between a total electrostatic capacity of the first capacitor C1 and the second capacitor C2 and an electrostatic capacity of the third capacitor C3, the amplitude of the load current can be enlarged as compared with the amplitude of the main switch current. Therefore, a large amplitude operation in the load can be achieved, while a conduction loss in the main switch is suppressed.

It is preferable that electrostatic capacities of the first capacitor C1 and the second capacitor C2 be identical to each other.

To be specific, when the amplitude of a current flowing through first switch S1 and the second switch S2 is lsmax, and the amplitude of a current flowing through the impedance element R is lomax, a ratio Ar of the amplitude lomax of a current flowing through the impedance element R relative to the amplitude lsmax of a current flowing through the first switch S1 and the second switch S2 is represented by the following expression: Ar=lomax/lsmax.

When an electrostatic capacity of the first capacitor C1 is $C_{C1}$, an electrostatic capacity of the second capacitor C2 is $C_{C2}$, and an electrostatic capacity of the third capacitor C3 is $C_{C3}$, the expression $Ar=1+C_{C3}/(C_{C2}+C_{C1})$ is satisfied. Thus, by setting the electrostatic capacity $C_{C1}$ of the first capacitor C1, the electrostatic capacity $C_{C2}$ of the second capacitor C2, and the electrostatic capacity $C_{C3}$ of the third capacitor C3 in accordance with a given Ar, it is possible to realize a large amplitude operation of the load current while suppressing the switch current.

Next, a full-bridge ZVS high-frequency inverter with four switches according to the present invention is described below.

Figure 4:
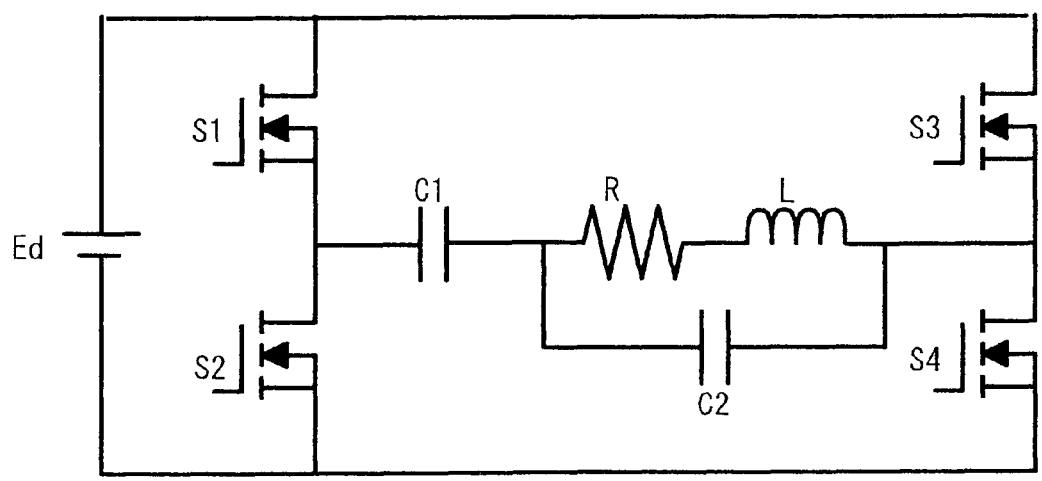
FIG. 4 is a view showing a circuit structure of a full-bridge ZVS high-frequency inverter with four switches in one embodiment of the present invention.

FIG. 4 shows a circuit structure of the full-bridge ZVS high-frequency inverter 3 with four switches in one embodiment of the present invention.

In the full-bridge ZVS high-frequency inverter 3 with four switches in this embodiment, a first switch S1 and a second switch S2 are connected in series between power sources Ed, and a third switch S3 and a fourth switch S4 are connected in series between the power sources Ed. A first capacitor C1, an impedance element R, and an inductor element L are connected in series between a connecting path connecting the first switch S1 and the second switch S2 and a connecting path connecting the third switch S3 and the fourth switch S4. A second capacitor C2 is connected in parallel to the impedance element R and the inductor element L which are connected in series.

Although MOSFETs are used as the switches in this embodiment, the switches may be any type selected from self-turn off devices such as IGBTs, MOSFETs, and SITs. It is preferable to select the IGBT for a frequency of from 15 kHz to 40 kHz, and to select the MOSFET or SIT for a frequency of from 40 kHz to 1 MHz.

In the full-bridge ZVS high-frequency inverter 3 with four switches in this embodiment, the second capacitor C2 constitutes a parallel resonant circuit together with the impedance element R and the inductor element L. By connecting the first capacitor C1 in series to the parallel resonant circuit, a sudden change in a voltage at the first and fourth switches S1 and S4 and the second and third switches S2 and S3 can be prevented to thereby achieve the ZVS based on charging and discharging operations upon switching.

Due to the cooperation of the first capacitor C1 and the second capacitor C2, it is possible to enlarge the amplitude of the load current as compared with the amplitude of the main switch current. Therefore, a large amplitude operation in the load can be attained, while a conduction loss in the main switch is suppressed.

To be specific, when the amplitude of a current flowing through the first switch S1 and the fourth switch S4 or the amplitude of a current flowing through the first switch S2 and the second switch S3 is lsmax, and the amplitude of a current flowing through the impedance element R is lomax, a ratio Ar of the amplitude lomax of a current flowing through the impedance element R relative to the amplitude lsmax of a current flowing through the first switch S1 and the fourth switch S4 or a current flowing through the second switch S2 and the third switch S3 is represented by the following expression: Ar=lomax/lsmax.

When an electrostatic capacity of the first capacitor C1 is $C_{C1}$, and an electrostatic capacity of the second capacitor C2 is $C_{C2}$, the expression $Ar=1+C_{C2}/C_{C1}$ is satisfied. Thus, by setting the electrostatic capacity $C_{C1}$ of the first capacitor C1 and the electrostatic capacity $C_{C2}$ of the second capacitor C2 in accordance with a given Ar, it is possible to realize a large amplitude operation of the load current while suppressing the switch current.

The number of combinations of circuit constants is indefinite. However, in this embodiment, a simulation test was conducted with an input voltage Ed being 270 (V), an operating frequency fo being 100 (kHz), R being 0.3 (ohm), L being 28 (microhenry), C1 being 0.047 (microfarad), C2 being 0.047 (microfarad), and a dead time being 0.28 (microsecond).

Figure 5:
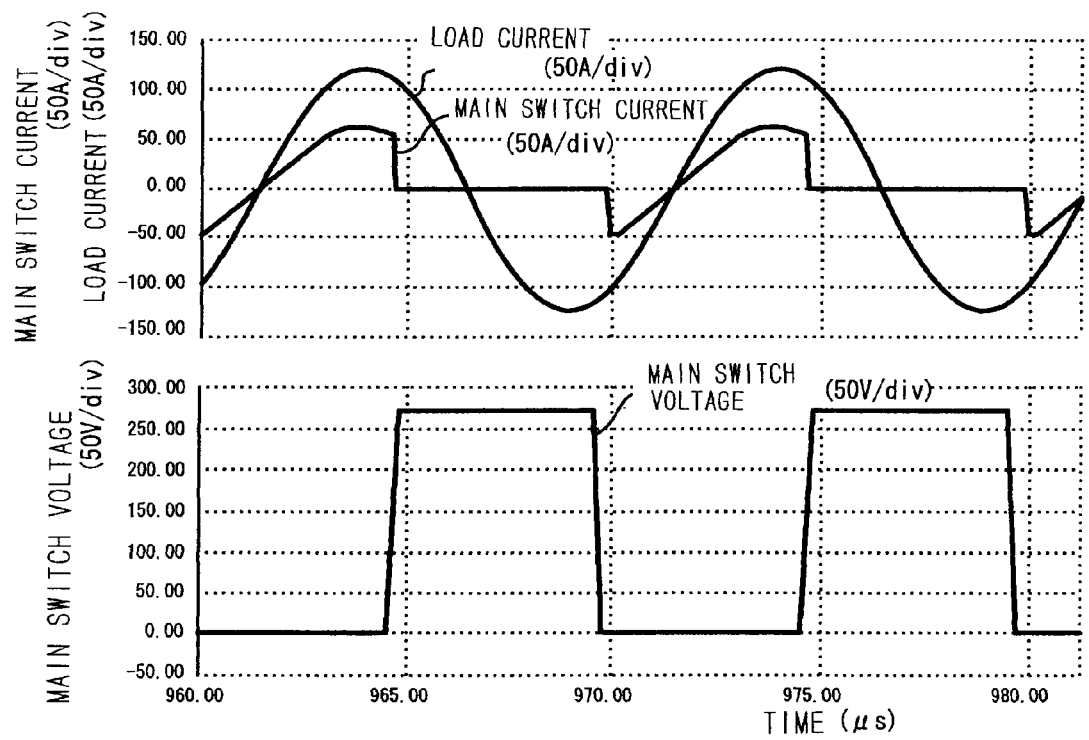
FIG. 5 is a graph showing operational waveforms in the full-bridge ZVS high-frequency inverter with four switches.
Figure 6:
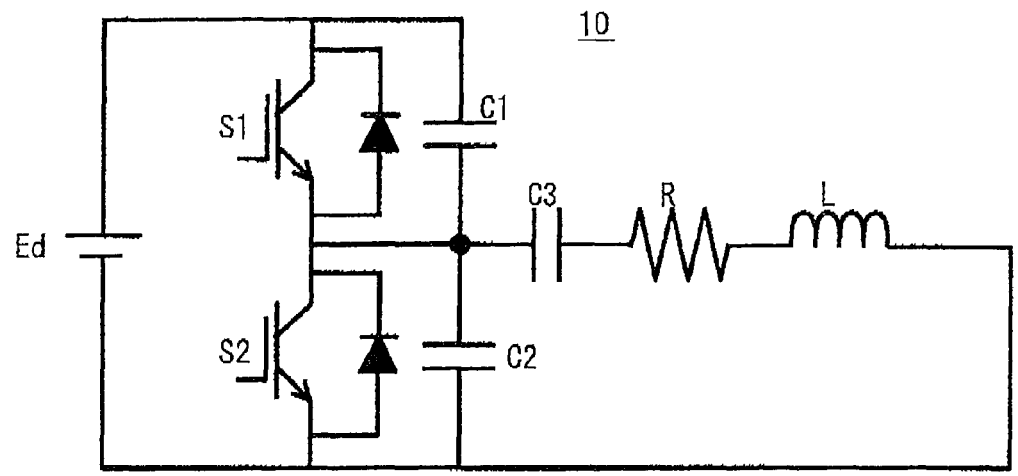
FIG. 6 is view showing a circuit structure of a conventional series resonance half-bridge ZVS high-frequency inverter with two switches.
Figure 7:
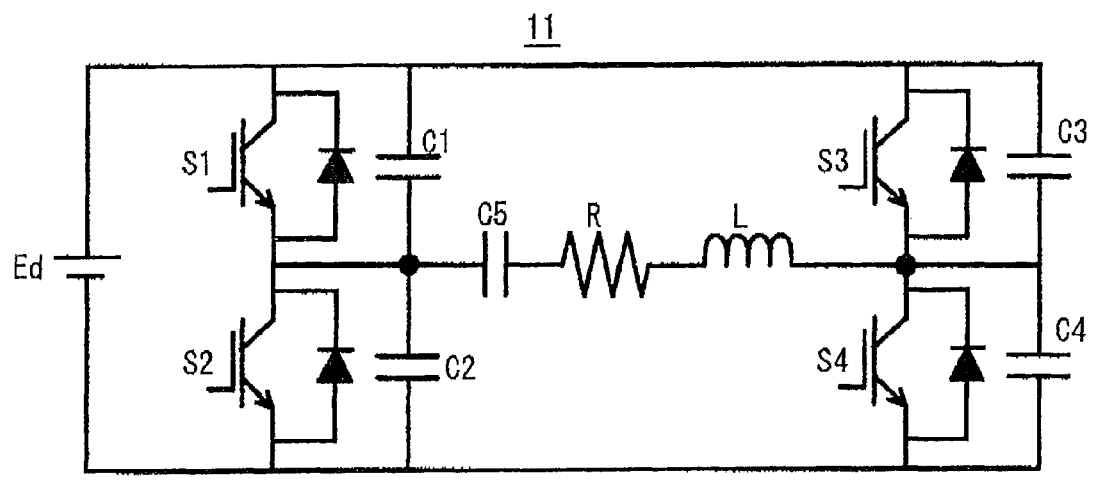
FIG. 7 is a view showing a circuit structure of a conventional series resonance full-bridge ZVS high-frequency inverter with four switches.

FIG. 5 shows operating waveforms in the full-bridge ZVS high-frequency inverter 3 with four switches which was operated with the above-described circuit constants.

In FIG. 5, the axis of abscissa shows the time period, the axis of ordinate shows the amplitude. The time periods for the upper and lower graphs are correspondent to each other. In the upper graph, the sine waveform shows the load current, and the half-periodic oscillation waveform shows the main switch current. In the lower graph, the waveform of a trapezoidal shape shows the main switch voltage.

As shown in FIG. 5, owing to the circuit constants in this embodiment, the amplitude of the load current is twice the amplitude of the main switch current.

The ratio between the electrostatic capacity of the first capacitor C1 and the electrostatic capacity of the second capacitor C2 mainly depends on an operating frequency of a resonant circuit and an inductance of the inductor element L. However, by conducting a plurality of trials for circuit constants, it was found that the amplitude of the load current could be increased by a factor of from 1.2 to 2.2 times the amplitude of the main switch current.

Similar to the half-bridge ZVS high-frequency inverter with two switches, especially when a value of the load resistance is low, it can be specifically expected that the amplitude of the loading current is enlarged while the main switch current is suppressed.

As compared with the conventional series resonance full-bridge ZVS high-frequency inverter, the full-bridge ZVS high-frequency inverter 3 with four switches according to the present invention can have a significantly simple circuit structure, with the removal of the capacitors connected in parallel to the respective switches and with the cooperation of the first capacitor C1 and the second capacitor C2.

As described above, according to the zero-voltage switching high-frequency inverter of the present invention, it is possible to fulfill the ZVS function. Simultaneously, a circuit structure thereof can be significantly simplified as compared with the conventional zero-voltage switching high-frequency inverter.

When the present invention is applied to, for example, an induction heating load having a low load resistance value, a particular effect can be produced in which a remarkably large current can be supplied to the load while the amplitude of a current flowing through a main switch can be suppressed.

The invention claimed is:

1. A zero-voltage switching high-frequency inverter comprising:
   a first switch and a second switch that are connected in series between power sources;
   a first capacitor and a second capacitor that are connected in series between the power sources;
   an impedance element and an inductor element that are connected in series between a connecting path connecting the first switch and the second switch and a connecting path connecting the first capacitor and the second capacitor; and
   a third capacitor connected in parallel to the impedance element and the inductor element, wherein
   when a ratio of an amplitude of a current flowing through the impedance element (Iomax) relative to an amplitude of a current flowing through the first switch and the second switch (Ismax) is Ar (Iomax/Ismax), an electrostatic capacity of the first capacitor is $C_{C1}$, an electrostatic capacity of the second capacitor is $C_{C2}$, and an electrostatic capacity of the third capacitor is $C_{C3}$, the electrostatic capacity $C_{C1}$ of the first capacitor, the electrostatic capacity $C_{C2}$ of the second capacitor, and the electrostatic capacity $C_{C3}$ of the third capacitor are chosen such that an expression $Ar=1+C_{C3}/(C_{C1}+C_{C2})$ is satisfied.

2. The zero-voltage switching high-frequency inverter according to claim 1, wherein
   the ratio between a total electrostatic capacity of the first capacitor and the second capacitor and an electrostatic capacity of the third capacitor is set at a predetermined ratio, such that a current flowing through the impedance element is larger than a current flowing through the first switch and the second switch.

3. The zero-voltage switching high-frequency inverter according to claim 1, wherein
   the switches are formed of self-turn off devices including IGBTs, MOSFETs, and SITs.

* * * * *